(12) United States Patent
Raaf

(10) Patent No.: US 6,389,300 B2
(45) Date of Patent: May 14, 2002

(54) METHOD FOR DATA TRANSMISSION IN A MOBILE RADIO SYSTEM, MOBILE STATION, AND BASE STATION

(75) Inventor: Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/849,909

(22) Filed: May 4, 2001

Related U.S. Application Data

(63) Continuation of application No. PCT/DE99/03498, filed on Nov. 2, 1999.

(30) Foreign Application Priority Data

Nov. 4, 1998 (DE) .......................................... 198 50 866

(51) Int. Cl.$^7$ ................................................. H04Q 7/00
(52) U.S. Cl. ........................ 455/561; 455/439; 455/445
(58) Field of Search ................................. 455/561, 565, 455/436, 439, 442, 443, 445, 448, 414

(56) References Cited

U.S. PATENT DOCUMENTS

| | | | |
|---|---|---|---|
| 5,068,916 A | * 11/1991 | Harrison et al. | ............... 455/39 |
| 5,177,740 A | 1/1993 | Toy et al. | ................. 370/100.1 |
| 5,592,471 A | * 1/1997 | Briskman | ................... 455/52.3 |
| 5,722,074 A | * 2/1998 | Muszynski | ................... 455/442 |
| 5,978,365 A | * 11/1999 | Yi | ............................... 455/436 |

OTHER PUBLICATIONS

Published International Publication WO 97/25827 (Christian Menzel), dated Jul. 17, 1997.

Published International Publication WO 94/29981 (Olof Grimlund et al.), dated Dec. 22, 1994.

Published International Publication WO 92/10886 (Tapio Paavonen et al.), dated Jun. 25, 1992.

* cited by examiner

*Primary Examiner*—Daniel Hunter
*Assistant Examiner*—Thuan T. Nguyen
(74) *Attorney, Agent, or Firm*—Laurence A. Greenberg; Werner H. Stemer; Ralph E. Locher

(57) ABSTRACT

Interruption phases are inserted in a UMTS transmission in order to monitor GSM base stations. In order to reduce the number of these interruption phases, a message is transmitted from the mobile station to the UMTS base station after receiving information which is sufficient for the adjacent channel search, in order to influence or restrict the insertion of further interruption phases.

60 Claims, 3 Drawing Sheets

METHOD FOR DATA TRANSMISSION IN A MOBILE RADIO SYSTEM, MOBILE STATION, AND BASE STATION

CROSS-REFERENCE TO RELATED APPLICATION

This application is a continuation of copending International Application No. PCT/DE99/03498, filed Nov. 2, 1999, which designated the United States.

BACKGROUND OF THE INVENTION

1. Field of the Invention

The invention lies in the telecommunications field. More specifically, the invention relates to a base station, a mobile station and a method for data transmission in a communications system, in particular in a CDMA mobile radio system, with the data being transmitted in structured form in frames in such a manner that it is possible for a mobile station to carry out other functions, in particular to carry out measurements via a receiving device, during one or more interruption phases in which it interrupts the reception (of the previous source or of the data of the base station) and/or the processing of received data or the sending process. In the following text, the term "transmission" also means sending and/or receiving.

In communications systems, data (normally voice data, image data or system data) are transmitted on transmission paths between base stations and mobile stations. In radiocommunications systems, this is done using electromagnetic waves via an air or radio interface. In the process, carrier frequencies are used which are in the frequency band provided for the respective system. In the case of GSM (Global System for Mobile Communications), the carrier frequencies lie in the neighborhood of 900 MHz. For future radiocommunications system, for example the UMTS (Universal Mobile Telecommunications System) or other third-generation systems, the frequencies provided are in the frequency band around 2000 MHz.

Particularly in future CDMA systems, transmission from the base station is essentially continuous in the downlink direction, for example, that is to say in the direction from a base station to a mobile station. The data transmitted during the sending process are normally structured into frames, which each have a predetermined length. Particularly in the case of different services, such as voice data transmission and video data transmission, the frames may also have a different structure and length. The structure and/or length of each frame in a continuous sequence of frames is, however, predetermined and/or is identified by the mobile station.

Particularly in cellular mobile radio systems, the mobile station occasionally has to carry out functions other than data reception as well, which cannot be carried out at the same time, at least when only a single receiving device is being operated. For example, the mobile station in a cellular radiocommunications system in which the base stations in different cells transmit at different frequencies, it is necessary to carry out measurements from time to time to determine whether the mobile station can receive radio signals with good reception quality from another base station. For this purpose, the mobile station sets its receiving device to a frequency other than the frequency at which it is currently receiving data.

In order to be able to send from the base station to the mobile station without any interruption, it has already been proposed for the mobile station to be equipped with a second receiving device. However, this solution is generally rejected in practice, for cost reasons.

Another proposal is known, on the basis of which the base station interrupts the sending process at predetermined times in order to allow the receiving station to carry out an adjacent channel search (search for an adjacent base station or for specific data packets transmitted from these base stations which, in the following text, is also intended to mean synchronization, frequency-correction or pilot-signal bursts) via its single receiving device.

In order to avoid data loss, the base station initially sends the data at a higher transmission rate than the essentially constant continuous transmission rate. To avoid this leading to higher bit error rates (BER), the transmission power must also be increased during this time.

The frequency at which the interruption phases recur and the length of the interruption phases depend on the respective system and also on the respective operating mode of the system. For example, interruption phases each having a length of 5 to 6 ms are sufficient for an adjacent channel search by a mobile station in a cellular-organized radiocommunications system. In systems with an HCS (Hierarchic Cell Structure), it is sufficient to carry out an interruption phase approximately every 100 ms. Since the reduction in the transmission quality also increases with the number of interruption phases inserted, it is desirable to insert as few interruption phases as possible.

SUMMARY OF THE INVENTION

The object of the present invention is to provide a method for data transmission of the above-mentioned type, a mobile station, and a base station which overcome the above-noted deficiencies and disadvantages of the prior art devices and methods of this general kind, and which allow monitoring of second base stations while maintaining good transmission quality.

With the above and other objects in view there is provided, in accordance with the invention, a method for data transmission in a mobile radio system, which comprises:

transmitting data between a first base station and a mobile station using a first transmission method;

during specific transmission phases, inserting interruption phases wherein the mobile station interrupts a transmission of data and the mobile station is switched to receive data packets from a second base station using a second transmission method; and depending on a reception result, sending information influencing an insertion of the interruption phases from the mobile station to the first base station.

In an alternative embodiment of the novel method, the method steps include:

transmitting data in structured form in frames from a first base station to a mobile station;

during specific transmission phases, inserting interruption phases wherein the mobile station interrupts at least one process selected from the group consisting of receiving data and processing received data, and the mobile station is switched to receive data packets from a second base station; and depending on a reception result, sending information influencing the insertion of interruption phases from the mobile station to the first base station.

In a further variation, there is provided a method of transmitting data in a mobile radio system, which comprises:

transmitting data in structured form in frames from a mobile station to a first base station;

during specific transmission phases, inserting interruption phases wherein the mobile station interrupts the transmission of data, and wherein the mobile station is switched to receive data packets from a second base station; and depending on a reception result, sending information influencing the insertion of interruption phases from the mobile station to the first base station.

With the above and other objects in view there is also provided, in accordance with the invention, a mobile station, comprising:

means for transmitting data from and to a first base station using a first transmission method;

means, connected to said transmitting means, for inserting pauses at least during specific transmission phases, in which a transmission of data is interrupted;

means for switching to reception of data packets sent from a second base station using a second transmission method;

means for determining a reception result relating to the data packets; and means, connected to said determining means, for sending information to the first base station, and to therewith influence an insertion of interruption phases as a function of the reception result of the mobile station.

Alternatively, there is provided a mobile station, comprising:

means for receiving data sent in structured form in frames from a first base station;

means for inserting pauses, at least during specific reception phases, during which one of a reception and processing of received data is interrupted;

means for switching a reception of data packets sent from a second base station;

means for determining a reception result relating to the data packets; and means for sending information to the first base station, and to therewith influence an insertion of interruption phases as a function of the reception result of the mobile station.

There is also provided, in accordance with the invention, a mobile station, comprising:

means for transmitting data sent in structured form in frames to a first base station;

means for inserting pauses, at least during specific transmission phases, during which a transmission of data is interrupted;

means for switching to receiving data packets sent from a second base station;

means for determining a reception result relating to the data packets; and means for sending information to the first base station, and to therewith influence an insertion of interruption phases as a function of the reception result of the mobile station.

There is also provided a base station, comprising:

means for transmitting data from and to a mobile station;

means, connected to said transmitting means, for inserting interruption phases at least during specific transmission phases;

means, connected to said inserting means, for receiving information influencing an insertion of the interruption phases; and means, connected to said receiving means, for influencing the insertion of interruption phases as a function of a reception result of the mobile station.

In the alternative, there is also provided, a base station, comprising:

means for sending data in structured form in frames to a mobile station;

means, connected to said sending means, for inserting interruption phases, at least during specific transmission phases;

means, connected to said inserting means, for receiving information influencing an insertion of the interruption phases; and means, connected to said receiving means, for influencing the insertion of interruption phases as a function of a reception result of the mobile station.

In accordance with a concomitant feature of the invention, a novel base station comprises:

means for receiving data in structured form in frames from a mobile station;

means for inserting interruption phases at least during specific reception phases;

means, connected to said inserting means, for receiving information influencing an insertion of the interruption phases; and means, connected to said inserting means, for influencing the insertion of interruption phases as a function of a reception result of the mobile station.

The invention is accordingly based on the idea of sending information, which influences the insertion of interruption phases, from the mobile station to the first base station depending on a reception result which is obtained during the interruption phases, in which the receiving device is switched to receive data packets from the second base stations.

The data packets sent from the second base station may also be data packets (synchronization data packets) which are to be detected or characteristic data packets (frequency-correction data packets).

The expression influencing the insertion of interruption phases also means restricting the number of future interruption phases and/or ending the insertion of interruption phases and/or controlled continuation of the insertion of further interruption phases and/or controlling the duration of the interruption phases.

The expression "the mobile station is switched to receive data packets" in the context of this application also means that, after the conventional analog and digital filtering and, possibly, derotation, the received data packet is compared with the correlation sequence corresponding to the training sequence (for example is correlated with it), and a search for data packets is thus carried out. Other methods may also be used instead of correlation (for example FIR, IRR or other filters). If a data packet is received or is detected with adequate quality, or the information transported by means of the data packet is determined with adequate quality, etc., then it is possible to speak of a positive reception result for this data packet.

Thus, while, for example, data are transmitted in the downlink direction from a first base station to a mobile station using a first transmission method, interruption phases are inserted at least during specific transmission phases, in which interruption phases the mobile station interrupts the reception of the data sent from the first base station and/or the processing of the received data, and in which interruption phases the mobile station is switched to receive data packets which are sent from a second base station using a second transmission method. Depending on a reception result relating to these data packets sent from a second base station, information which influences the insertion of interruption phases is sent from the mobile station to the first base station.

A first transmission method which is used by a first base station may in this case be a CDMA method, and a second transmission method, which is used by a second base station, may be a GSM method. Thus, for example, in order to monitor GSM base stations, interruption phases are inserted in a UMTS transmission. In order to reduce the number of these interruption phases once sufficient information for the adjacent channel search has been received, a message is transmitted from the mobile station to the UMTS base station in order to influence or restrict the insertion of further interruption phases.

It is thus possible to end the insertion of interruption phases as early as possible, and thus to restrict them as much as possible, as soon as sufficient information relating to the second base stations to be monitored is known, and thus to improve the transmission quality.

In one design variant of the invention, once a characteristic data packet has been received, no more interruption phases are inserted after reception of a following data packet which is to he detected.

It is thus possible to keep the number of interruption phases that need to be inserted low by using the known frame structure of the data transmission from the second base station to the mobile station.

Another development variant of the invention provides for the mobile station to be switched to receive data packets from a number of base stations and, depending on the reception results, for information which influences the insertion of the interruption phase to be sent to the first base station.

This means that a number of adjacent base stations can be monitored successively, and that the insertion of interruption phases can be ended for the time being as soon as they have been monitored to a sufficient extent.

A further refinement of the invention provides for the information for influencing the insertion of the interruption phases, and information relating to the second and/or third base stations, to be transmitted by means of the same message.

This allows adjacent base stations to be monitored, and information relating to the observation results to be transmitted, with as little signaling complexity as possible.

Other features which are considered as characteristic for the invention are set forth in the appended claims.

Although the invention is illustrated and described herein as embodied in a method for data transmission in a mobile radio system, a mobile station and a base station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
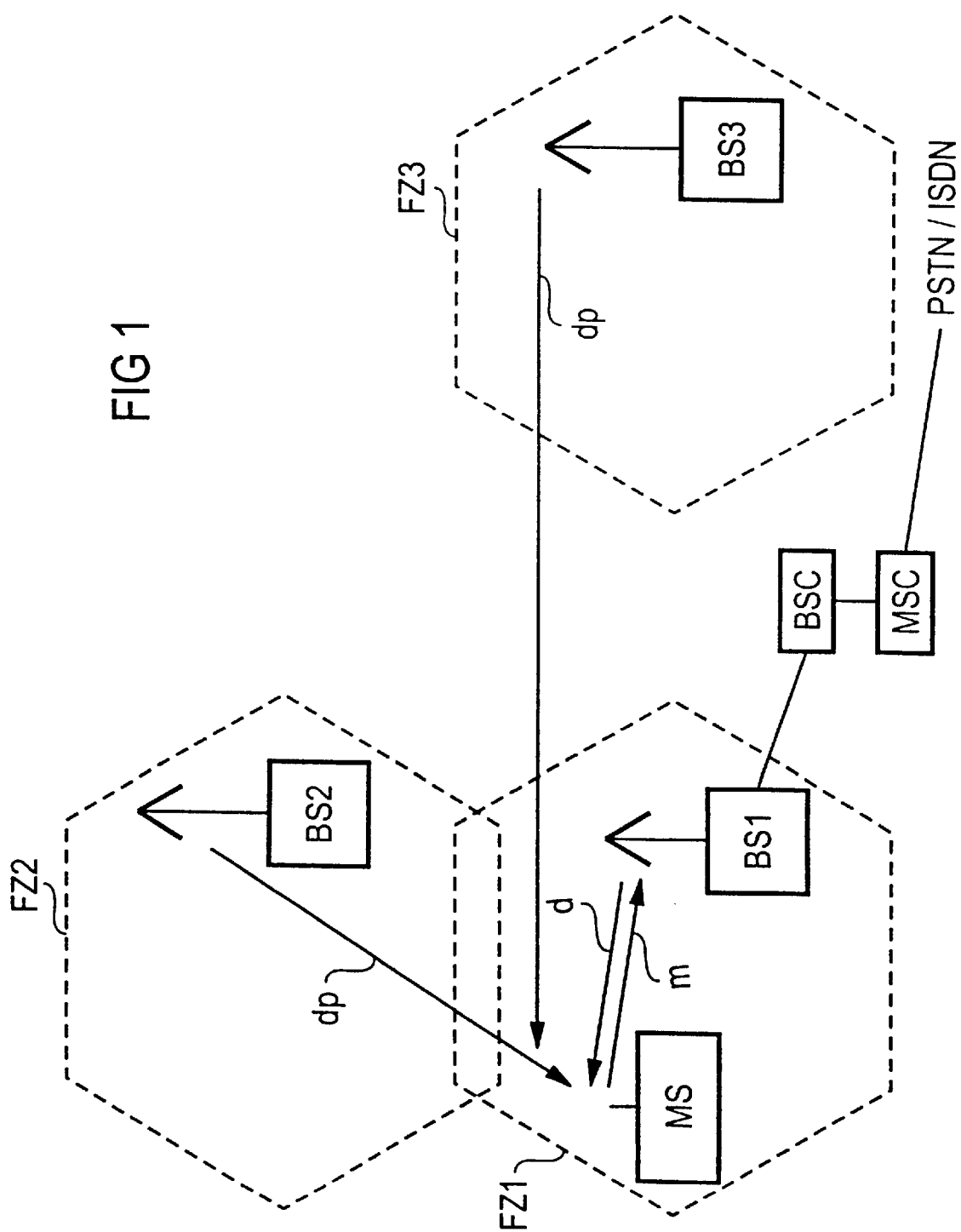
FIG. 1 is a diagrammatic view of a cell structure outline of a mobile radio system.

Referring now to the figures of the drawing in detail and first, particularly, to FIG. 1 thereof, there is seen a cellular mobile radio network which comprises, by way of example, a combination of a GSM (Global System for Mobile Communications) system with a UMTS (Universal Mobile Telecommunications System) system and which comprises a large number of mobile switching centers MSC which are networked with one another and produce access to a landline network PSTN/ISDN. Furthermore, these mobile switching centers MSC are each connected to at least one base station controller BSC, which can also be formed by a data processing system.

Each base station controller BSC is in turn connected to at least one base station BS. Such a base station BS is a radio station which can set up a radio link to other radio stations, which are referred to as mobile stations MS, via a radio interface. Information can be transmitted by means of radio signals within radio channels which lie within frequency bands, between the mobile station MS and the base station BS associated with the mobile stations MS. A radio cell FZ is essentially defined by the range of the radio signals from a base station.

Base stations BS and a base station controller BSC may be combined to form a base station system. The base station system BSS is in this case also responsible for the radio channel administration and allocation, for data rate matching, for monitoring the radio transmission path, for the handover procedures and, in the case of a CDMA system, for the allocation of the spread code sets to be used, and transmits the signaling information required for this purpose to the mobile stations MS.

For FDD (Frequency Division Duplex) systems used for the uplink (mobile station to base station) in a duplex system, for example a GSM system, the frequency bands provided are not the same as those for the downlink (base station to the mobile station) and, for TDD (Time Division Duplex) systems, such as the DECT (Digital Enhanced Cordless Telecommunications) system, different time periods are provided for the uplink and downlink. An FDMA (Frequency Division Multiple Access) method allows a number of frequency channels to be used within the various frequency bands.

Terminology and examples used for the purposes of this description also often relate to a GSM mobile radio system; however, they are in no way limited to such a system but, on the basis of the description, can also easily be applied by a person skilled in the art to other, possibly future, mobile radio systems such as CDMA systems, in particular wideband CDMA systems or TD/CDMA systems. The expression first base station BS1 means in particular a UMTS base station or a CDMA base station, and the terms second and/or third base stations BS2, BS3 mean in particular GSM (adjacent) base stations to be monitored. The term mobile station means, in particular, a dual mode mobile station which is configured not only for receiving/sending GSM signals but also for receiving/sending UMTS signals or CDMA signals, and may also be set up for stationary operation, if required.

Figure 2:
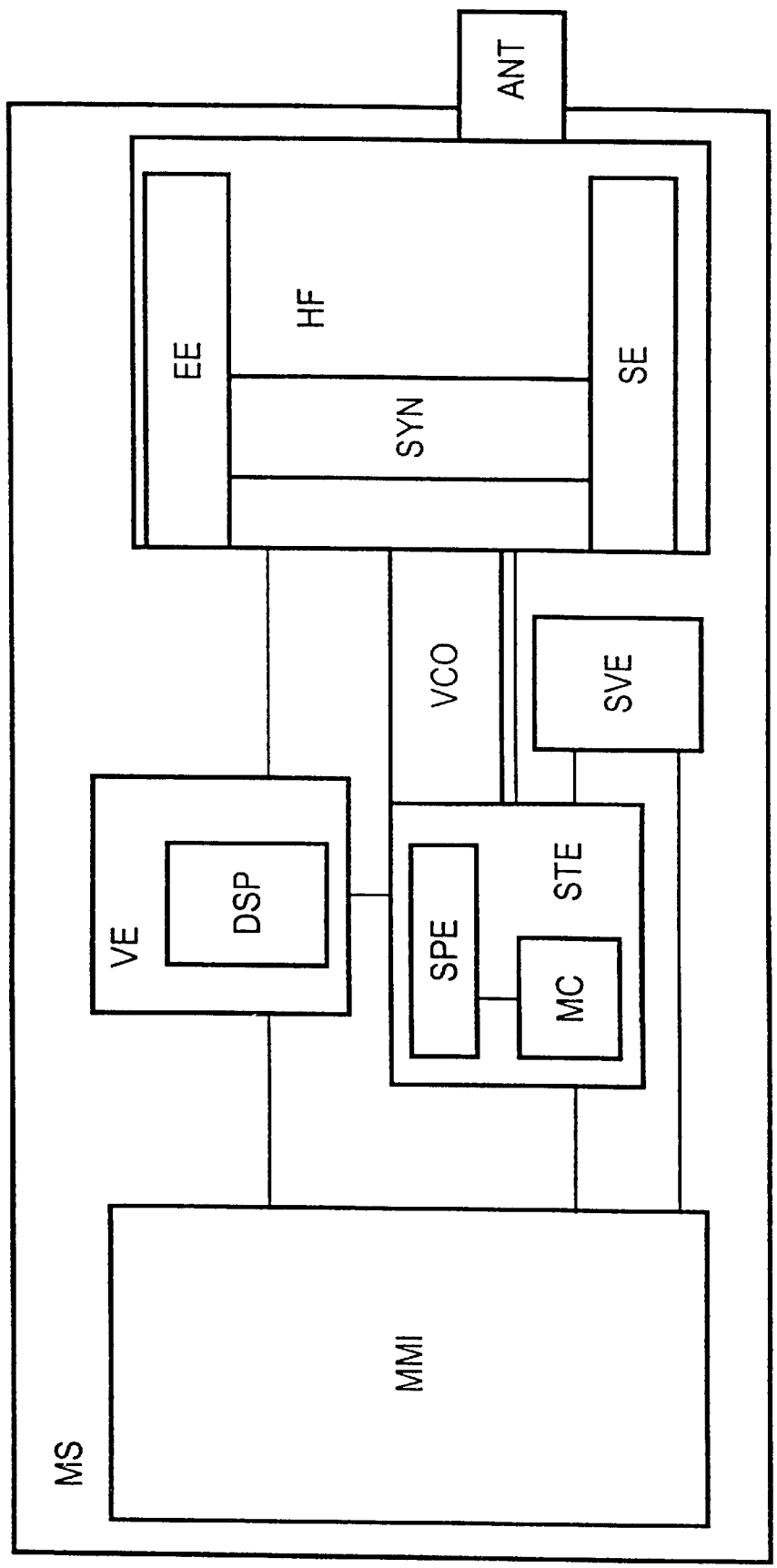
FIG. 2 is a block diagram of a mobile station.

Referring now to FIG. 2, there is shown a radio station, which may be a mobile station MS. The radio station comprises a control unit MMI, a control device STE, a processing device VE, a power supply device SVE, a receiving device EE and a transmitting device SE.

The control device STE essentially comprises a programmable microcontroller MC which can make read and write access to memory modules SPE. The microcontroller MC controls and monitors all the major elements and functions in the radio station, essentially controls the communications and signaling process, reacts to keypad inputs by carrying out the appropriate control procedures, and is also responsible for switching the appliance to different operating modes.

The processing device VE may also be formed by a digital signal processor DSP, which can likewise access memory modules SPE.

The volatile or non-volatile memory modules SPE are used to store the program data which are required for controlling the radio station and the communication process, in particular including the signaling procedures, appliance information, information entered by the user, and information that arises during the processing of signals.

The radio-frequency part HF comprises the transmitting device SE with a modulator and an amplifier, and the receiving device EE with a demodulator, and likewise with an amplifier.

The transmitting device SE and the receiving device EE are supplied via the synthesizer SYN with the frequency from a voltage controlled oscillator VCO. The voltage controlled oscillator VCO can also be used to produce the system clock for use as the clock for the processor devices in the appliance.

An antenna device ANT is provided for receiving and transmitting signals via the air interface of the mobile radio system.

As noted above, the radio station may also be a base station BS. In this case, the control unit is replaced by a connection for a mobile radio network, for example via a base station controller BSC or a switching device MSC. In order to interchange data simultaneously with a number of mobile stations MS, the base station ES has a corresponding large number of transmitting and receiving devices.

Figure 3:
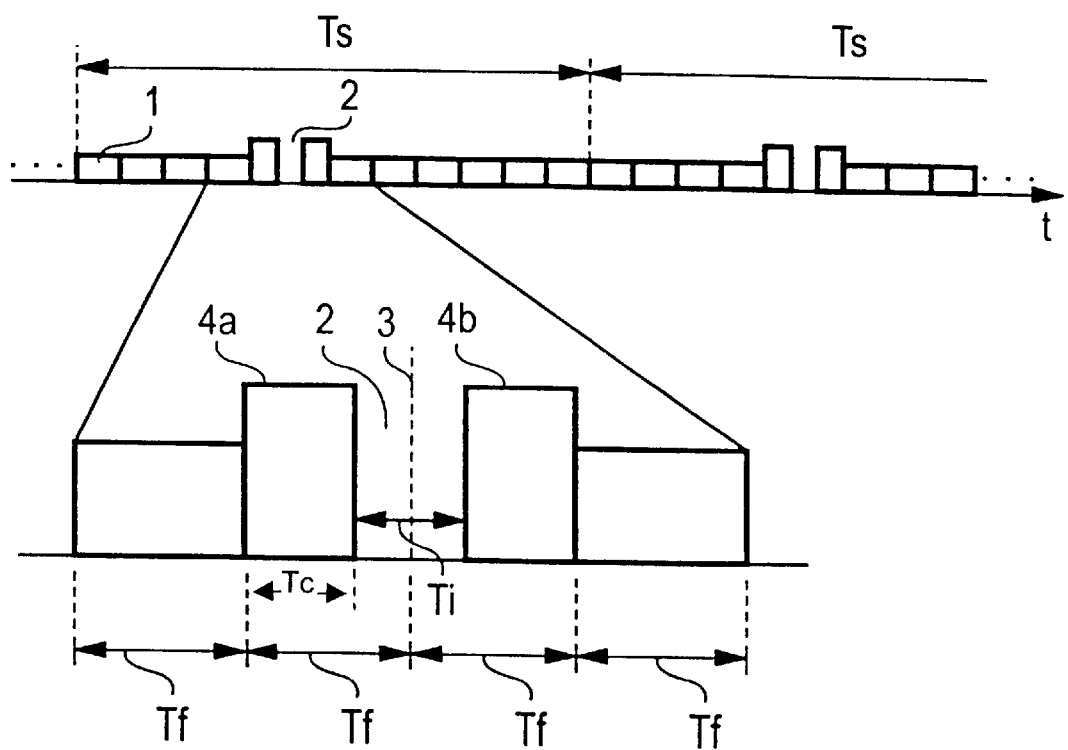
FIG. 3 is a schematic timing diagram illustrating the insertion of interruption phases during a transmission phase.

Referring now to FIG. 3, there is shown the frame structure for data transmission with a short delay time, in particular for voice transmission in a UMTS (Universal Mobile Telecommunications System), in which one superframe in each case contains 12 individual frames 1 for data transmission. In this case, the illustration shows, in particular, a transmission phase in the downlink from a first base station BS1, in particular a UMTS base station BS1, to a mobile station MS, in particular a dual mode mobile station MS which, in addition to receiving UMTS data is also designed to receive GSM data packets. The embodiments described in the following text are essentially limited to the downlink. However, it is self-evident that the invention can be applied not only to downlink transmission but also to uplink transmission. It is within the scope of knowledge of those skilled in the art for the exemplary embodiments for the downlink described in the following text to be incorporated in uplink transmission.

The individual frames 1 each have a transmission length Tf of 10 ms. The superframe, therefore, has a total transmission length Ts of 120 ms. The fifth and sixth individual frames 1 in each case have a common interruption phase 2, which may overlap their frame boundary 3 with a length Ti. The length Ti is, for example, 6 ms. The subsections of the first frame 4a (frame 5 in the superframe), which starts before the interruption phase 2, and of the second frame 4b (frame 6 in the superframe), which ends after the interruption phase 2, are of equal length, or of equal size. In the exemplary embodiment shown in FIG. 3, voice data are being transmitted, so that the maximum acceptable delay for evaluation of the data received by the mobile station is 10 ms, that is to say one frame length Tf. The data within a frame are resorted, are coded jointly, and are transmitted superimposed on one another. In the exemplary embodiment, the transmission rate of the first frame 4a and of the second frame 4b is in each case increased such that the same quantity of information to be transmitted, and which is sent in uncompressed frames 1 over the frame length Tf is sent in the time period Tc=Tf−Ti/2.

In this case, at least the transmission of data to a specific mobile station which is carrying out the adjacent channel search is interrupted during the interruption phases, while the transmission to other mobile stations can be continued, which is possible by virtue of the use of a multiple access method, for example a CDMA method.

A GSM frame transmitted by the GSM base station contains eight timeslots, each of which contains one data packet. The data packets transmitted from the GSM base station BS2, such as synchronization data packets (data packets to be detected, synchronization burst), frequency-correction data packets (characteristic data packets, frequency correction burst) and normal data packets are all in the same time pattern. One frequency-correction data packet and, one time frame later in each case, one synchronization data packet are transmitted from the GSM base stations four times every ten time frames (GSM frames) and then after 11 time frames (GSM frames) (a total of 51 time frames).

By way of example, when the mobile station MS is in the call state or the user-data transmission state with a current UMTS base station BS1, the interruption phases are inserted in the downlink transmission at specific times/in specific time periods, between which there may be fixed time intervals or time intervals of different lengths, and during this time the receiving device in the mobile station MS is switched to receive data packets from respectively adjacent GSM base stations BS2, BS3. Thus, during the interruption phase 2, the UMTS base station interrupts the transmission of data to the mobile station MS, and the mobile station MS interrupts the reception and/or processing of data which are sent from the UMTS base station BS1. The mobile station MS uses the receiving device EE to carry out an adjacent channel search by the control device STE switching the receiving device EE to receive adjacent GSM base stations BS2 and the data packets which are sent from them, in order to receive any synchronization data packets dp which may occur and are sent from adjacent GSM base stations BS2, BS3.

The adjacent channel search also has the aim of detection of a synchronization data packet which is to be detected. If, in one design variant of the invention, the mobile station MS receives a synchronization data packet, which is to be detected, in one of these interruption phases, then the adjacent channel search is ended, at least with regard to this base station BS2, and the mobile station MS sends appropriate control information m (SCH found), if necessary via suitable signaling channels, to the first base station BS1, the UMTS base station. At least initially, the UMTS base station BS1 does not then insert any further interruption phases in the downlink data stream d.

The detection of a synchronization data packet, which is to be detected, can also be achieved by receiving a characteristic frequency-correction data packet, since, owing to the known frame structure, the position of a synchronization data packet is known once a frequency-correction data packet has been received. Since, in the GSM system, the frequency-correction data packets are transmitted by the base stations BS2, BS3 one time frame before the synchronization data packets, then, in addition to receiving synchronization data packets, the mobile station MS in a design variant of the invention, can also be switched to receive frequency-correction data packets. In this case, the mobile station MS uses the receiving device EE to carry out an adjacent channel search in the interruption phases, by the control device STE switching the receiving device EE to receive adjacent GSM base stations BS2, in order to receive any synchronization data packets and frequency-correction data packets which may occur and are sent from adjacent GSM base stations BS2, BS3.

The expression "the mobile station is switched to receive data packets which are to be detected and characteristic data packets" in the context of this description also means that, after the conventional analog and digital filtering and, possibly, derotation, the received data packet is compared (for example correlated) not only with the correlation sequence corresponding to the training sequence of a characteristic data packet dp, but also with the correlation sequence corresponding to the training sequence of a data packet dp which is to be detected, and the search is thus carried out simultaneously, or in parallel, for data packets which are to be detected and for characteristic data packets. If required, other methods may also be used instead of correlation (for example FIR, IRR or other filters).

In one design variant, the mobile station MS can now, after receiving a frequency-correction data packet, send to the UMTS base station BS1 information m (FCCH found) which results initially in only one further interruption phase being inserted in the transmitted data stream, in order to receive the synchronization data packet, which follows the frequency-correction data packet at a fixed interval. The knowledge of the relative time position between the frequency-correction data packet and the synchronization data packet allows the timing and also the duration (since the time slot is now known) of the interruption phase which is to be inserted to be matched to the timing of the synchronization data packet which is to be detected. Corresponding information relating to the timing of a frequency-correction data packet or of a following synchronization data packet can be transmitted with the FCCH-found message.

Another design variant of the invention provides first of all for switching to the monitoring of a first adjacent GSM base station BS2 and for the adjacent channel search for one or more further GSM base stations BS3 to be carried out after a successful search or on the basis of knowledge of an unsuccessful search and, after successful and/or unsuccessful completion of the adjacent channel search for a number of adjacent GSM base stations BS2, BS3, for information m to be transmitted to the UMTS base station BS1 for influencing and/or restricting and/or ending and/or controlled continuation of the insertion of interruption phases. To this end, the initially determined results of the adjacent channel search can be buffer-stored in the mobile station MS by memory devices SPE.

In the situation where no adjacent channel search is successful, one refinement of the invention provides for this fact likewise to be signaled by means of corresponding information m (FCCH/SCH not found). In response, the UMTS base station initially does not insert any further interruption phases in the downlink data stream d.

In one development of the invention, the results of the adjacent channel search, for example the identity of the adjacent base station and the reception quality or field strength of the signals received from the adjacent base stations, are transmitted to the UMTS base station BS1 together with the information for influencing the insertion of interruption phases, as a message which may, if necessary, be split between a number of frames.

In another design variant of the invention, the first base station BS1 is also a GSM base station which transmits data in accordance with a GSM standard, or a standard derived from it.

I claim:

1. A method for data transmission in a mobile radio system, which comprises:
   transmitting data between a first base station and a mobile station using a first transmission method;
   during specific transmission phases, inserting interruption phases wherein the mobile station interrupts a transmission of data and the mobile station is switched to receive data packets from a second base station using a second transmission method; and
   depending on a reception result, sending information influencing an insertion of the interruption phases from the mobile station to the first base station.

2. The method according to claim 1, which comprises, when a data packet to be detected is received, sending information from the mobile station to the first base station upon which no further interruption phases are inserted.

3. The method according to claim 1, which comprises, after receiving a characteristic data packet, sending information from the mobile station to the first base station which results in interruption phases no longer being inserted after receiving a following data packet that is to be detected.

4. The method according to claim 1, which comprises, after receiving a characteristic data packet, sending information from the mobile station to the first base station which effect an insertion of another interruption phase for receiving the data packet which is to be detected after a predetermined time interval between characteristic data packets and data packets to be detected.

5. The method according to claim 1, which comprises:
   after receiving one of a characteristic data packet and a data packet to be detected from a second base station, switching the mobile station to receive one of a characteristic data packet and a data packet to be detected from one or more third base stations; and
   after receiving one of a characteristic data packet and a data packet to be detected, from none, from one, or from a plurality of third base stations, transmitting information from the mobile station to the first base station in order to influence the insertion of the interruption phases and/or to transmit information via one of second and third base stations.

6. The method according to claim 1, which comprises storing the data packets received by the mobile station from a second base station during a predetermined time period in a memory.

7. The method according to claim 1, which comprises evaluating the data packets received by the mobile station from a second base station during a predetermined time period.

8. The method according to claim 1, which comprises transmitting information influencing the insertion of the interruption phases and information relating to base stations in the same message.

9. The method according to claim 1, which comprises communicating with the second base stations in one of a GSM mobile radio system and a system derived therefrom, and wherein the data packets to be detected are synchronization data packets and the characteristic data packets are frequency-correction data packets.

10. A method of transmitting data in a mobile radio system, which comprises:

transmitting data in structured form in frames from a first base station to a mobile station;

during specific transmission phases, inserting interruption phases wherein the mobile station interrupts at least one process selected from the group consisting of receiving data and processing received data, and the mobile station is switched to receive data packets from a second base station; and depending on a reception result, sending information influencing the insertion of interruption phases from the mobile station to the first base station.

11. The method according to claim 10, which comprises, when a data packet to be detected is received, sending information from the mobile station to the first base station upon which no further interruption phases are inserted.

12. The method according to claim 10, which comprises, after receiving a characteristic data packet, sending information from the mobile station to the first base station which results in interruption phases no longer being inserted after receiving a following data packet that is to be detected.

13. The method according to claim 10, which comprises, after receiving a characteristic data packet, sending information from the mobile station to the first base station which effect an insertion of another interruption phase for receiving the data packet which is to be detected after a predetermined time interval between characteristic data packets and data packets to be detected.

14. The method according to claim 10, which comprises:

after receiving one of a characteristic data packet and a data packet to be detected from a second base station, switching the mobile station to receive one of a characteristic data packet and a data packet to be detected from one or more third base stations; and after receiving one of a characteristic data packet and a data packet to be detected, from none, from one, or from a plurality of third base stations, transmitting information from the mobile station to the first base station in order to influence the insertion of the interruption phases and/or to transmit information via one of second and third base stations.

15. The method according to claim 10, which comprises storing the data packets received by the mobile station from a second base station during a predetermined time period in a memory.

16. The method according to claim 10, which comprises evaluating the data packets received by the mobile station from a second base station during a predetermined time period.

17. The method according to claim 10, which comprises transmitting information influencing the insertion of the interruption phases and information relating to base stations in the same message.

18. The method according to claim 10, which comprises communicating with the second base stations in one of a GSM mobile radio system and a system derived therefrom, and wherein the data packets to be detected are synchronization data packets and the characteristic data packets are frequency-correction data packets.

19. A method of transmitting data in a mobile radio system, which comprises:

transmitting data in structured form in frames from a mobile station to a first base station;

during specific transmission phases, inserting interruption phases wherein the mobile station interrupts the transmission of data, and wherein the mobile station is switched to receive data packets from a second base station; and depending on a reception result, sending information influencing the insertion of interruption phases from the mobile station to the first base station.

20. The method according to claim 19, which comprises, when a data packet to be detected is received, sending information from the mobile station to the first base station upon which no further interruption phases are inserted.

21. The method according to claim 19, which comprises, after receiving a characteristic data packet, sending information from the mobile station to the first base station which results in interruption phases no longer being inserted after receiving a following data packet that is to be detected.

22. The method according to claim 19, which comprises, after receiving a characteristic data packet, sending information from the mobile station to the first base station which effect an insertion of another interruption phase for receiving the data packet which is to be detected after a predetermined time interval between characteristic data packets and data packets to be detected.

23. The method according to claim 19, which comprises:

after receiving one of a characteristic data packet and a data packet to be detected from a second base station, switching the mobile station to receive one of a characteristic data packet and a data packet to be detected from one or more third base stations; and after receiving one of a characteristic data packet and a data packet to be detected, from none, from one, or from a plurality of third base stations, transmitting information from the mobile station to the first base station in order to influence the insertion of the interruption phases and/or to transmit information via one of second and third base stations.

24. The method according to claim 19, which comprises storing the data packets received by the mobile station from a second base station during a predetermined time period in a memory.

25. The method according to claim 19, which comprises evaluating the data packets received by the mobile station from a second base station during a predetermined time period.

26. The method according to claim 19, which comprises transmitting information influencing the insertion of the interruption phases and information relating to base stations in the same message.

27. The method according to claim 19, which comprises communicating with the second base stations in one of a GSM mobile radio system and a system derived therefrom, and wherein the data packets to be detected are synchronization data packets and the characteristic data packets are frequency-correction data packets.

28. A mobile station, comprising:

means for transmitting data from and to a first base station using a first transmission method;

means, connected to said transmitting means, for inserting pauses at least during specific transmission phases, in which a transmission of data is interrupted;

means for switching to reception of data packets sent from a second base station using a second transmission method;

means for determining a reception result relating to the data packets; and means, connected to said determining means, for sending information to the first base station, and to therewith influence an insertion of interruption phases as a function of the reception result of the mobile station.

29. The mobile station according to claim 28, which comprises means for sending information to the first base station, for obviating the insertion of further interruption phases.

30. The mobile station according to claim 28, which comprises means for sending information to the first base station, for obviating the insertion of further interruption phases after receiving a following data packet to be detected.

31. The mobile station according to claim 28, which comprises means for sending information to the first base station, to cause the insertion of another interruption phase for receiving the data packet to be detected after a predetermined time period between characteristic data packets and data packets to be detected.

32. The mobile station according to claim 28, which comprises:

means for switching to reception of a characteristic data packet and/or of a data packet which is to be detected from one or more third base stations after receiving a characteristic data packet, and/or a data packet to be detected from a second base station; and means for sending information to the first base station in order to influence the insertion of the interruption phases and/or to transmit information relating to one of second and third base stations after receiving a characteristic data packet or a data packet to be detected from none, from one, or from a plurality of third base stations.

33. The mobile station according to claim 28, which comprises means for at least one of storing and evaluating data packets received by a second base station in a predetermined time period.

34. A mobile station, comprising:

means for receiving data sent in structured form in frames from a first base station;

means for inserting pauses, at least during specific reception phases, during which one of a reception and processing of received data is interrupted;

means for switching a reception of data packets sent from a second base station;

means for determining a reception result relating to the data packets; and means for sending information to the first base station, and to therewith influence an insertion of interruption phases as a function of the reception result of the mobile station.

35. The mobile station according to claim 34, which comprises means for sending information to the first base station, for obviating the insertion of further interruption phases.

36. The mobile station according to claim 34, which comprises means for sending information to the first base station, for obviating the insertion of further interruption phases after receiving a following data packet to be detected.

37. The mobile station according to claim 34, which comprises means for sending information to the first base station, to cause the insertion of another interruption phase for receiving the data packet to be detected after a predetermined time period between characteristic data packets and data packets to be detected.

38. The mobile station according to claim 34, which comprises:

means for switching to reception of a characteristic data packet and/or of a data packet which is to be detected from one or more third base stations after receiving a characteristic data packet, and/or a data packet to be detected from a second base station; and means for sending information to the first base station in order to influence the insertion of the interruption phases and/or to transmit information relating to one of second and third base stations after receiving a characteristic data packet or a data packet to be detected from none, from one, or from a plurality of third base stations.

39. The mobile station according to claim 34, which comprises means for at least one of storing and evaluating data packets received by a second base station in a predetermined time period.

40. A mobile station, comprising:

means for transmitting data sent in structured form in frames to a first base station;

means for inserting pauses, at least during specific transmission phases, during which a transmission of data is interrupted;

means for switching to receiving data packets sent from a second base station;

means for determining a reception result relating to the data packets; and means for sending information to the first base station, and to therewith influence an insertion of interruption phases as a function of the reception result of the mobile station.

41. The mobile station according to claim 40, which comprises means for sending information to the first base station, for obviating the insertion of further interruption phases.

42. The mobile station according to claim 40, which comprises means for sending information to the first base station, for obviating the insertion of further interruption phases after receiving a following data packet to be detected.

43. The mobile station according to claim 40, which comprises means for sending information to the first base station, to cause the insertion of another interruption phase for receiving the data packet to be detected after a predetermined time period between characteristic data packets and data packets to be detected.

44. The mobile station according to claim 40, which comprises:

means for switching to reception of a characteristic data packet and/or of a data packet which is to be detected from one or more third base stations after receiving a characteristic data packet, and/or a data packet to be detected from a second base station; and means for sending information to the first base station in order to influence the insertion of the interruption phases and/or to transmit information relating to one of second and third base stations after receiving a characteristic data packet or a data packet to be detected from none, from one, or from a plurality of third base stations.

45. The mobile station according to claim 40, which comprises means for at least one of storing and evaluating data packets received by a second base station in a predetermined time period.

46. A base station, comprising:

means for transmitting data from and to a mobile station;

means, connected to said transmitting means, for inserting interruption phases at least during specific transmission phases;

means, connected to said inserting means, for receiving information influencing an insertion of the interruption phases; and means, connected to said receiving means, for influencing the insertion of interruption phases as a function of a reception result of the mobile station.

47. The base station according to claim 46, which comprises means for receiving and processing information resulting in no more interruption phases being inserted.

48. The base station according to claim 46, which comprises means for receiving and processing information resulting in no further interruption phases being inserted after receiving a following data packet to be detected.

49. The base station according to claim 46, which comprises means for receiving and processing information that results in an insertion of another interruption phase for receiving the data packet to be detected after a predetermined time period located between characteristic data packets and data packets to be detected.

50. The base station according to claim 46, which comprises means for receiving and processing information in order to influence an insertion of one of the interruption phases and information relating to one of second and third base stations.

51. A base station, comprising:

means for sending data in structured form in frames to a mobile station;

means, connected to said sending means, for inserting interruption phases, at least during specific transmission phases;

means, connected to said inserting means, for receiving information influencing an insertion of the interruption phases; and means, connected to said receiving means, for influencing the insertion of interruption phases as a function of a reception result of the mobile station.

52. The base station according to claim 51, which comprises means for receiving and processing information resulting in no more interruption phases being inserted.

53. The base station according to claim 51, which comprises means for receiving and processing information resulting in no further interruption phases being inserted after receiving a following data packet to be detected.

54. The base station according to claim 51, which comprises means for receiving and processing information that results in an insertion of another interruption phase for receiving the data packet to be detected after a predetermined time period located between characteristic data packets and data packets to be detected.

55. The base station according to claim 51, which comprises means for receiving and processing information in order to influence an insertion of one of the interruption phases and information relating to one of second and third base stations.

56. A base station, comprising:

means for receiving data in structured form in frames from a mobile station;

means for inserting interruption phases at least during specific reception phases;

means, connected to said inserting means, for receiving information influencing an insertion of the interruption phases; and means, connected to said inserting means, for influencing the insertion of interruption phases as a function of a reception result of the mobile station.

57. The base station according to claim 56, which comprises means for receiving and processing information resulting in no more interruption phases being inserted.

58. The base station according to claim 56, which comprises means for receiving and processing information resulting in no further interruption phases being inserted after receiving a following data packet to be detected.

59. The base station according to claim 56, which comprises means for receiving and processing information that results in an insertion of another interruption phase for receiving the data packet to be detected after a predetermined time period located between characteristic data packets and data packets to be detected.

60. The base station according to claim 56, which comprises means for receiving and processing information in order to influence an insertion of one of the interruption phases and information relating to one of second and third base stations.

* * * * *